(12) United States Patent
Yang (10) Patent No.: US 8,504,984 B1
(45) Date of Patent: Aug. 6, 2013

(54) MODIFYING GRAMMARS TO CORRECT PROGRAMMING LANGUAGE STATEMENTS

(75) Inventor: Don Hsi-Yun Yang, Milpitas, CA (US)

(73) Assignee: Google Inc., Mountain View, CA (US)

( * ) Notice: Subject to any disclaimer, the term of this patent is extended or adjusted under 35 U.S.C. 154(b) by 1104 days.

(21) Appl. No.: 12/474,373

(22) Filed: May 29, 2009

(51) Int. Cl.
 *G06F 9/44* (2006.01)

(52) U.S. Cl.
 USPC ........... 717/112; 717/126; 717/142; 717/141; 717/143; 717/111

(58) Field of Classification Search
 USPC .................................. 717/110, 111, 112, 114
 See application file for complete search history.

(56) References Cited

U.S. PATENT DOCUMENTS

| | | | | | |
|---|---|---|---|---|---|
| 4,989,145 | A | * | 1/1991 | Kyushima | 704/9 |
| 5,493,678 | A | * | 2/1996 | Arcuri et al. | 1/1 |
| 5,504,902 | A | * | 4/1996 | McGrath et al. | 717/146 |
| 5,513,305 | A | * | 4/1996 | Maghbouleh | 715/234 |
| 5,625,773 | A | * | 4/1997 | Bespalko et al. | 345/467 |
| 7,140,008 | B2 | * | 11/2006 | Chilimbi et al. | 717/158 |
| 7,316,011 | B1 | * | 1/2008 | Rajaram et al. | 717/157 |
| 7,975,059 | B2 | * | 7/2011 | Wang et al. | 709/230 |
| 8,321,848 | B2 | * | 11/2012 | Johnson | 717/143 |
| 2004/0103401 | A1 | * | 5/2004 | Chilimbi et al. | 717/130 |
| 2004/0205728 | A1 | * | 10/2004 | Hanson | 717/129 |
| 2005/0005266 | A1 | * | 1/2005 | Datig | 717/136 |
| 2007/0083856 | A1 | * | 4/2007 | Chilimbi et al. | 717/128 |
| 2007/0234070 | A1 | * | 10/2007 | Horning et al. | 713/190 |
| 2008/0320452 | A1 | * | 12/2008 | Thompson | 717/136 |
| 2011/0029946 | A1 | * | 2/2011 | Joukov et al. | 717/100 |
| 2011/0145785 | A1 | * | 6/2011 | Centonze et al. | 717/108 |

OTHER PUBLICATIONS

Proebsting, Todd A. and Benjamin G. Zorn. "Programming Shorthands." Microsoft Research: Technical Report MSR-TR-2000-03; Jan. 19, 2000.
Wikia. "Omni Completion." [Mar. 25, 2009] Retrieved from the Internet: <URL: http://vim.wikia.com/wiki/Omni_Completion>.

* cited by examiner

*Primary Examiner* — Lewis A Bullock, Jr.
*Assistant Examiner* — Getente A Yimer
(74) *Attorney, Agent, or Firm* — Birch, Stewart, Kolasch & Birch, LLP (57) ABSTRACT

In general, the subject matter described in this specification can be embodied in methods, systems, and program products for selecting a first grammar rule in a programming language grammar. The grammar is used for determining a syntax validity of a programming code statement in a text editor and the first grammar rule includes a hard-to-type symbol that is syntactically correct for the programming code statement. A second grammar rule for the grammar is created. The created second grammar rule is substantially identical to the first grammar rule but the hard-to-type symbol is replaced with an easy-to-type symbol that is syntactically incorrect for the programming code statement. An action is associated with the grammar and is performed upon satisfying the second grammar rule. Performance of the second grammar rule causes the easy-to-type symbol in the programming code statement in the text editor to be replaced with the hard-to-type symbol.

21 Claims, 4 Drawing Sheets

MODIFYING GRAMMARS TO CORRECT PROGRAMMING LANGUAGE STATEMENTS

BACKGROUND

Programming language grammars are used to generate parsers for determining the syntax validity of programming language statements. Some parsers read tokens that are extracted by lexical analyzers from input streams that include programming language statements. Error indications can be provided when parsers encounter incorrect syntax.

Users of text editors can find symbols required by a programming language syntax difficult or hard to type. This difficulty can arise because some keyboards are not designed for use with programming languages, requiring extended reaching or the use of shift keys to enter some common, but hard-to-type symbols. Entering such hard-to-type symbols can require additional effort by the user and may reduce the user's efficiency. Further, because the symbols are hard to type, users can make errors and re-compile a collection of programming language statements more than necessary if fewer errors were made.

SUMMARY

This specification describes technologies relating to modifying grammars to correct programming language statements. In general, one aspect of the subject matter described in this specification can be embodied in a method that includes selecting a first grammar rule in a programming language grammar. The grammar is used for determining a syntax validity of a programming code statement in a text editor and the first grammar rule includes a hard-to-type symbol that is syntactically correct for the programming code statement. A second grammar rule for the grammar is created. The created second grammar rule is substantially identical to the first grammar rule but the hard-to-type symbol is replaced with an easy-to-type symbol that is syntactically incorrect for the programming code statement. An action is associated with the grammar and is performed upon satisfying the second grammar rule. Performance of the second grammar rule causes the easy-to-type symbol in the programming code statement in the text editor to be replaced with the hard-to-type symbol. Other embodiments of this aspect include corresponding systems and computer program products.

These and other embodiments can optionally include one or more of the following features. The action can include code that is executed upon satisfying a condition of the second grammar rule. Execution of the code may effect replacement of an instance of the easy-to-type symbol in the text editor with an instance of the hard-to-type symbol. A parser may be generated from the grammar with the associated action. The generated parser can interact with the text editor to determine the syntax validity of programming code segments entered into the text editor by a user of the text editor. The parser can identify an instance of an easy-to-type but syntactically incorrect symbol entered into the text editor, and replace the instance of the easy-to-type symbol with an instance of the hard-to-type symbol. The hard-to-type symbol and the easy-to-type symbol can share a same key of a keyboard. A keyboard layout of a keyboard connected to a computing device for interfacing with the text editor can be identified. The identified keyboard layout is utilized in an identification of the hard-to-type and easy-to-type symbols. A type of programming language of the grammar and the programming code statement can be determined. The determined type of programming language can be utilized to identify the hard-to-type and easy-to-type symbols.

Particular implementations of the subject matter described in this specification can be implemented to realize one or more of the following advantages. A user entering programming language statements into a text editor may enter syntactically incorrect, but easy-to-type symbols in lieu of hard-to-type, but syntactically correct symbols. The ability to enter easy-to-type symbols can increase users' efficiency. For example, users may be able to type faster or correct syntax errors less often. Additionally, entering easy-to-type symbols may require less stress on users' fingers than entering hard-to-type symbols, reducing the likelihood of injuries (e.g., repetitive strain injuries).

The details of one or more implementations of the invention are set forth in the accompanying drawings and the description below. Other features, aspects, and advantages of the invention will become apparent from the description, the drawings, and the claims.

DESCRIPTION OF DRAWINGS

Like reference symbols in the various drawings indicate like elements.

DETAILED DESCRIPTION

Figure 1:
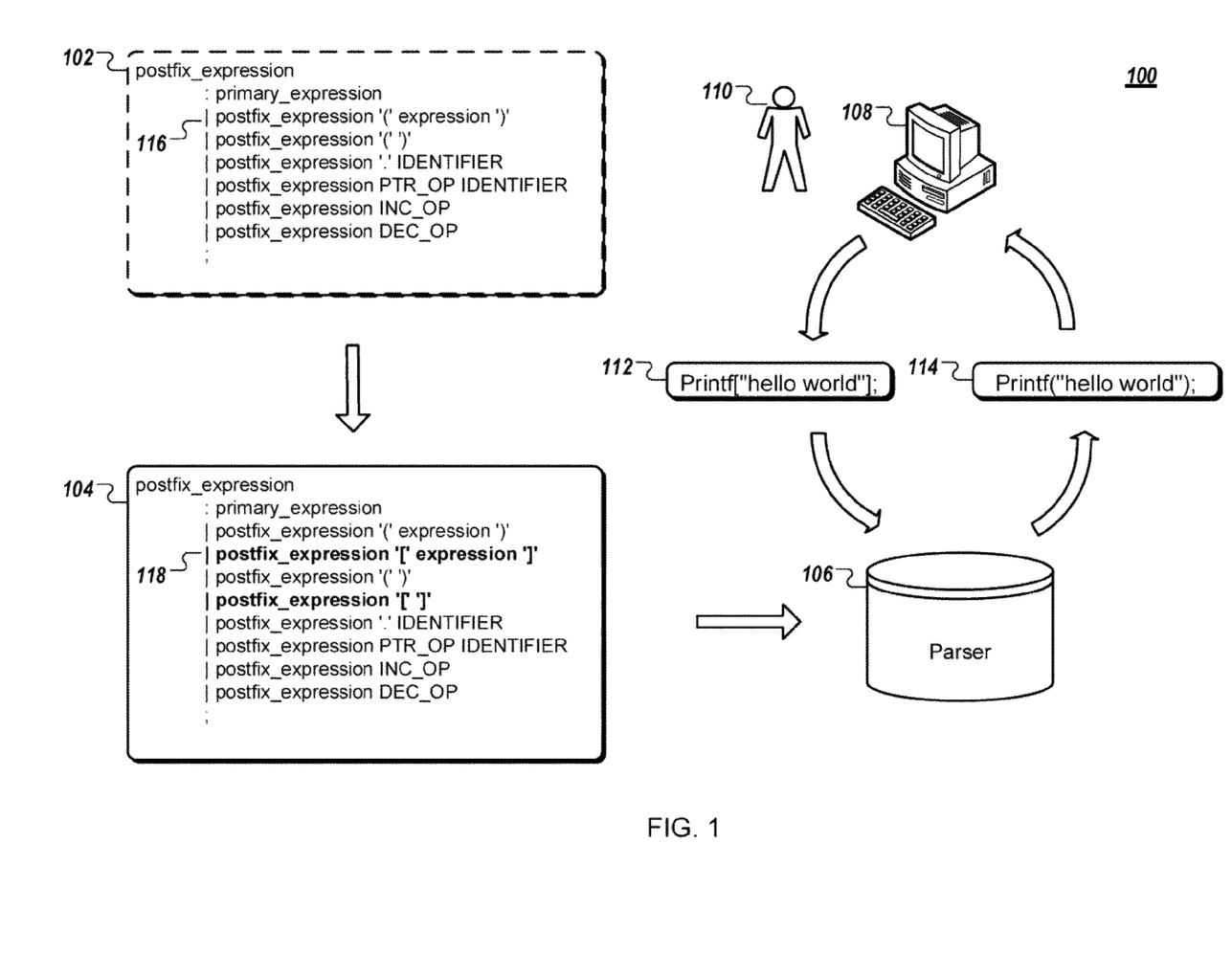
FIG. 1 illustrates an example system for modifying a grammar to correct programming language statements.

FIG. 1 illustrates an example system 100 for modifying a grammar to correct programming language statements. Pre-existing programming language grammar 102 is modified and processed by techniques described in connection with the present disclosure to produce modified programming language grammar 104. In some implementations, the grammar 102 is in Backus-Naur Form (BNF) or according to specifications for numerous parser generators, for example, Yacc, ANTLR, Coco/R, CUP, GNU bison, Eli, FSL, META 5, MUG2, Parsley, Pre-cc, SableCC, JavaCC, or MixedCC. Other types of grammars are possible.

Modified grammar 104 can be the same file or segment of computer memory as grammar 102, but modified with additional inserted grammar rules. In other examples, grammar 102 retains its original form and a separate grammar 104 is copied from grammar 102 but includes the inserted grammar rules. Grammars 102 and 104 include a set of rules shown on separate lines and separated by a pipe ("|") symbol. The rules describe programming language strings formed from a collection of symbols that are syntactically valid for a particular programming language. Grammars 102 and 104 represent example portions of larger grammar files.

Modified grammar 104 is similar to pre-existing grammar 102, but includes inserted grammar rules (in bold for emphasis). The inserted grammar rules are similar to rules from grammar 102 that are also present in modified grammar 104, except that a "hard-to-type" symbol (described in detail below) in the inserted grammar rule is replaced with an "easy-to-type symbol." For example, grammar rule 116 of grammar 102 is carried over into modified grammar 104. Additionally, new grammar rule 118, based upon grammar rule 116, is created with the hard-to-type parenthetical symbols "("and ")" replaced with easy-to-type bracket symbols "[" and "]".

Parser 106 is generated from modified grammar 104 and verifies the syntax of programming language statements (e.g., statement 112) entered by user 110 into a text editor that computing device 108 presents to the user. Programming language statements include portions of artificial language that are computer readable and designed to express operations that can be performed by a computer. In various implementations, parser 106 is a function that calls a low-level routine (e.g., a lexical analyzer) to retrieve tokens from an input stream. The input stream can read from a portion of memory, for example, a permanent file or a temporary buffer that contains the programming language statements. In some implementations, user 110 overtly executes parser 106 using the computing device 108. In other implementations, parser 106 is executed as user 110 enters programming language statements into the text editor, for example, when user 110 pauses typing, when the end of a line is reached, or when a programming language statement is completed.

In some implementations, parser 106 is a finite state machine that defines a number of nodes representing rules of modified grammar 104 and edges representing transitions between the rules. The collection of nodes and edges is represented with a finite state table that identifies a current state, a next token, and a next state. The finite state machine provides a solution to a sequential problem that requires a specific set of inputs before an output is performed. The finite state machine of the present disclosure requires specific sequences of tokens from the input stream or otherwise enters an error state.

For example, parser 106 traverses the finite state machine after receiving tokens representing the programming language statement 112 (i.e., Printf["hello world"]). If parser 106 is produced from pre-existing grammar 102, the parser enters an error state because statement 112 does not satisfy the rules in grammar 102 (i.e., because brackets are syntactically incorrect). On the other hand, because parser 106 is produced from grammar 104, grammar rule 118 is encountered and is satisfied. As described below in reference to FIGS. 2 and 4, grammar 104 is modified to include inserted programming code (called an action) that is executed upon satisfying the condition of the inserted grammar rules. The code causes replacement of the easy-to-type symbols in the text editor with the hard-to-type symbols.

Programming code segment 114 illustrates the replacement of the easy-to-type symbols in segment 112 (e.g., the brackets) with hard-to-type symbols (e.g., the parentheticals). Parser 106 can replace the symbols with numerous approaches. For example, parser 106 can transmit syntactically correct programming language statements to the text editor. In other implementations, parser 106 accesses a block of memory shared with the text editor, and parser 106 directly replaces programming language statement 112 with programming language statement 114. In still other implementations, parser 106 transmits a message to the text editor, asking the text editor to perform the replacement.

In some implementations, hard-to-type and easy-to-type symbol sets include symbols that are entered using the same key of a keyboard. Such example sets include "9/(", "0/)", "[/{","]/}", ",/<", and "./>". Example sets can also include symbols that look similar, for example, "[/(" and"]/)." The sets can include other, user-defined relationships or multiple-key combinations, for example, "lpar/(" or "rpar/)". In various implementations, system 100 identifies, based upon a programming language of grammar 102 and a user input device (e.g., a keyboard) of computing terminal 108, appropriate hard-to-type and easy-to-type symbol sets. In some implementations, symbols with reserved use in a particular programming language are compared with proximate keys of the identified keyboard to determine a potential pairing. Key proximity can be based upon a finger reach distance between a hard-to-type key and an easy-to-type key and whether or not a modifier (e.g., a Shift or Ctrl key) is required. As an illustration, system 100 can identify specific symbols with a reserved use for a particular programming language (e.g., programming language operators) as hard-to-type (e.g., the symbol is entered with the top row of the keyboard or requires the use of a Shift or Ctrl key). Symbols on the identified keyboard that are proximate to the hard-to-type symbol, are not as difficult to type, and do not have a reserved use for the programming language can be selected as an easy-to-type symbol corresponding to the hard-to-type symbol.

Figure 2:
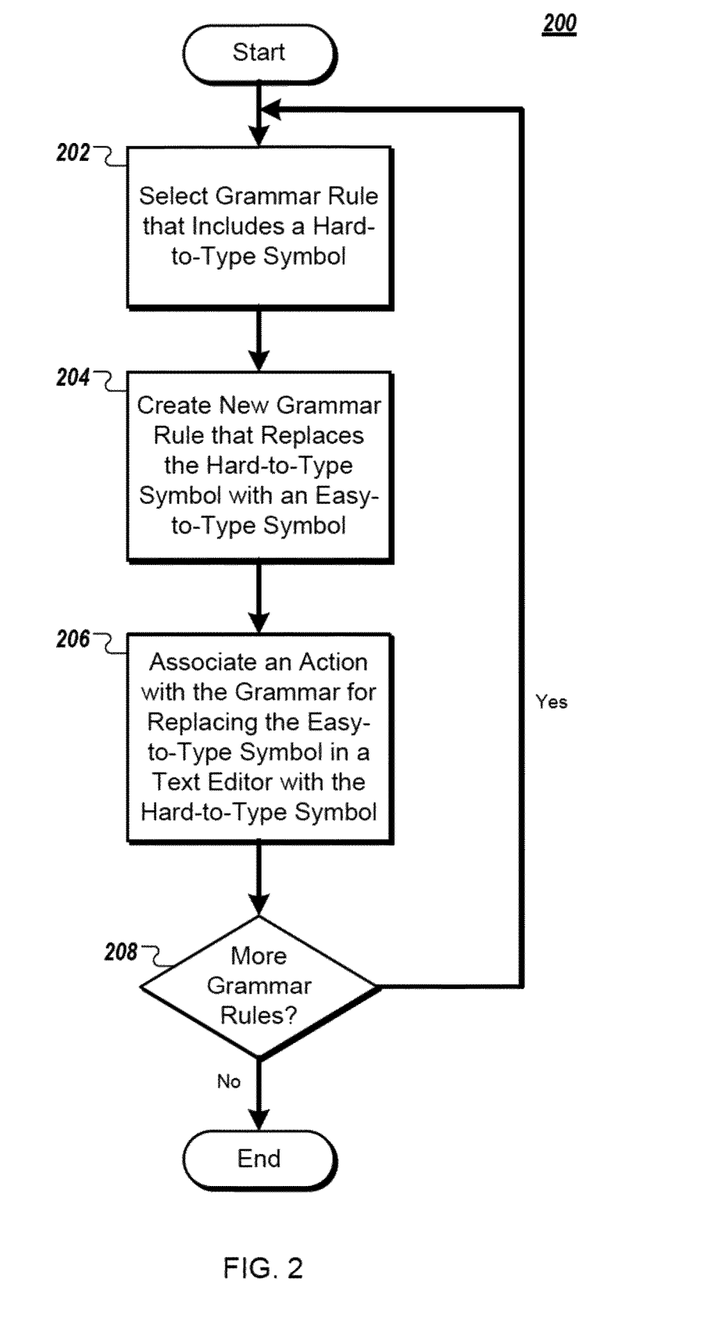
FIG. 2 illustrates a flow chart of an example process for modifying a grammar to correct programming language statements.

FIG. 2 illustrates a flow chart of example process 200 for replacing symbols in a text editor. The example process may be performed, for example, by systems 100 and 500 described in connection with the other figures. Another system or combination of systems, however, may be used to perform process 200.

In step 202, a grammar rule that includes a hard-to-type symbol is selected. For example, rule 116 of grammar 102, which includes a parenthetical, is selected. In some implementations, one or more kinds of hard-to-type symbols are previously identified and process 200 progresses through each rule in grammar 102 until a rule including at least one of the kinds of hard-to-type symbols is identified and selected. In various implementations, process 200 identifies pairs of hard-to-type symbols (e.g., left and right parentheticals). If a rule is identified as including a left parenthetical but does not include a right parenthetical, the rule is not selected.

In step 204, a new grammar rule substantially identical to the selected rule is created for a grammar, except that the new grammar rule replaces instances of the hard-to-type symbol with corresponding easy-to-type symbols. For example, new grammar rule 118 is created and inserted in response to the computerized selection of rule 116. The inserted grammar rule can be inserted or placed adjacent to or proximate in program execution to the selected grammar rule. The proximate locating ensures that tokens from an input stream that do not satisfy the selected grammar rule are also evaluated by the new grammar rule.

In step 206, an action for replacing the easy-to-type symbol in the text editor with the hard-to-type symbol is associated with the modified grammar. For example, the action can include programming code and can be inserted into the grammar. As described in connection with system 100, the code, when executed by parser 106, can transmit modified programming language segments to the text-editor, directly modify programming language segments in a portion of shared memory, or send a command to the text editor to perform the modification. In some implementations, the action directly follows a new grammar rule (e.g., the programming code may be enclosed in curly braces following the new grammar rule). The programming code can include all instructions necessary to perform the replacement or may call additional routines.

In step 208, a determination is made whether additional grammar rules have yet to be searched for instances of hard-to-type symbols by the operation of step 202. If there are no additional grammar rules, the process ends. If an additional grammar rule exists, the operation of step 202 is performed again. For example, process 200 may progress through grammar rules in grammar 102 and select grammar rule 116. If rule 116 was the last rule in grammar 102, process 200 would end. Process 200 continues, however, because grammar rule 116 is not the last rule in grammar 102. In this instance, the operation of step 202 selects another grammar rule—postfix_expression '("")'—because it includes the hard-to-type symbol.

Figure 3:
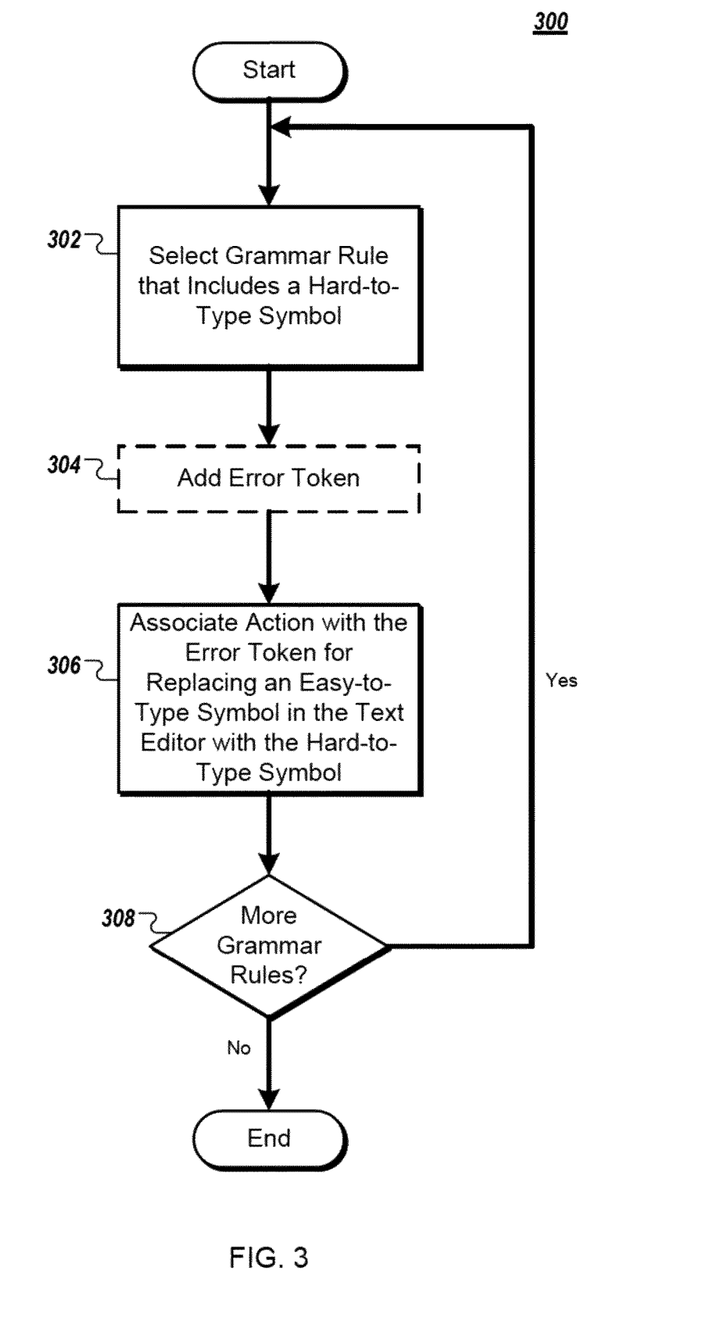
FIG. 3 illustrates a flow chart of an example process for modifying a grammar to correct programming language statements.

FIG. 3 illustrates a flow chart of example process 300 for replacing symbols in a text editor. The example process may be performed, for example, by systems 100 and 500, although some aspects of process 300 differ from the descriptions of systems 100 and 400 (e.g, in some implementations, process 300 creates a modified grammar that does not include an inserted grammar rule 118). Another system or combination of systems, however, may be used to perform process 300.

In step 302, a grammar rule that includes a hard-to-type symbol is selected from a plurality of grammar rules in a grammar. In some implementations, the grammar rule selection is similar to that of step 202 in process 200.

In step 304, an error token is added to the grammar. In some implementations, if an error is encountered during the processing by a parser generated from the modified grammar, programming code included in the error token is executed. The error token can include an error symbol identifying the error token. The parser, upon encountering a syntax error, may discard operations and proceed until a state with the error token is found. Thus, in various implementations, the error token is inserted in the grammar at locations that an input error might occur to provide a recovery subroutine. For example, the error token may be placed after a group of similar grammar rules, such as after the postfix expression rules in modified grammar 104. Insertion of the error token is optional (as indicated by the dashed outline), because an error token may already exist in an appropriate location.

In step 306, an action for replacing the easy-to-type symbol in the text editor with the hard-to-type symbol is associated with the error token (e.g., the action may be inserted into the error token). The action can include executable code that is executed when the parser enters an error state. In some implementations, execution of the code determines if easy-to-type symbols are present in recently read tokens, and if replacement of the easy-to-type symbols with hard-to-type symbols would satisfy a grammar rule where the error may have occurred. If replacement would satisfy a grammar rule, the code instructs replacement of the easy-to-type symbol in the text editor with the hard-to-type symbol. The inserted code can supplement or include error handling code for instances where an error not caused by the presence of an easy-to-type symbol occurs. In various implementations, the programming code restarts the parser at a pervious point in the input stream prior to the insertion of the replaced symbol. In other implementations, the parser is restarted where the error occurred, or at a subsequent position in the input stream (e.g., by discarding some of the tokens following the error).

In step 308, a determination is made whether additional grammar rules have yet to be searched for instances of hard-to-type symbols by the operation of step 302. If there are no additional grammar rules, the process ends. If an additional grammar rule exists, the operation of step 302 is performed again.

In various implementations, a text editor on a computing device (e.g., device 108) performs processes 300 and 400. In some implementations, processes 300 and 400 include additional operations that identify a keyboard layout associated with a keyboard attached to the computing device. For example, a user of the text editor can input an identification of the keyboard layout. In other examples, identification of the keyboard layout is performed without user input, for example, by querying the operating system of computing device 108 or computer circuitry in the keyboard. The identification can occur prior to the to the operations of steps 202 and 302. The result of the identification is used in determining hard-to-type and corresponding easy-to-type symbols. In some implementations, a modified grammar file for each of numerous keyboard layouts is created and the identification is used to select the grammar file or parser appropriate for the keyboard.

Figure 4:
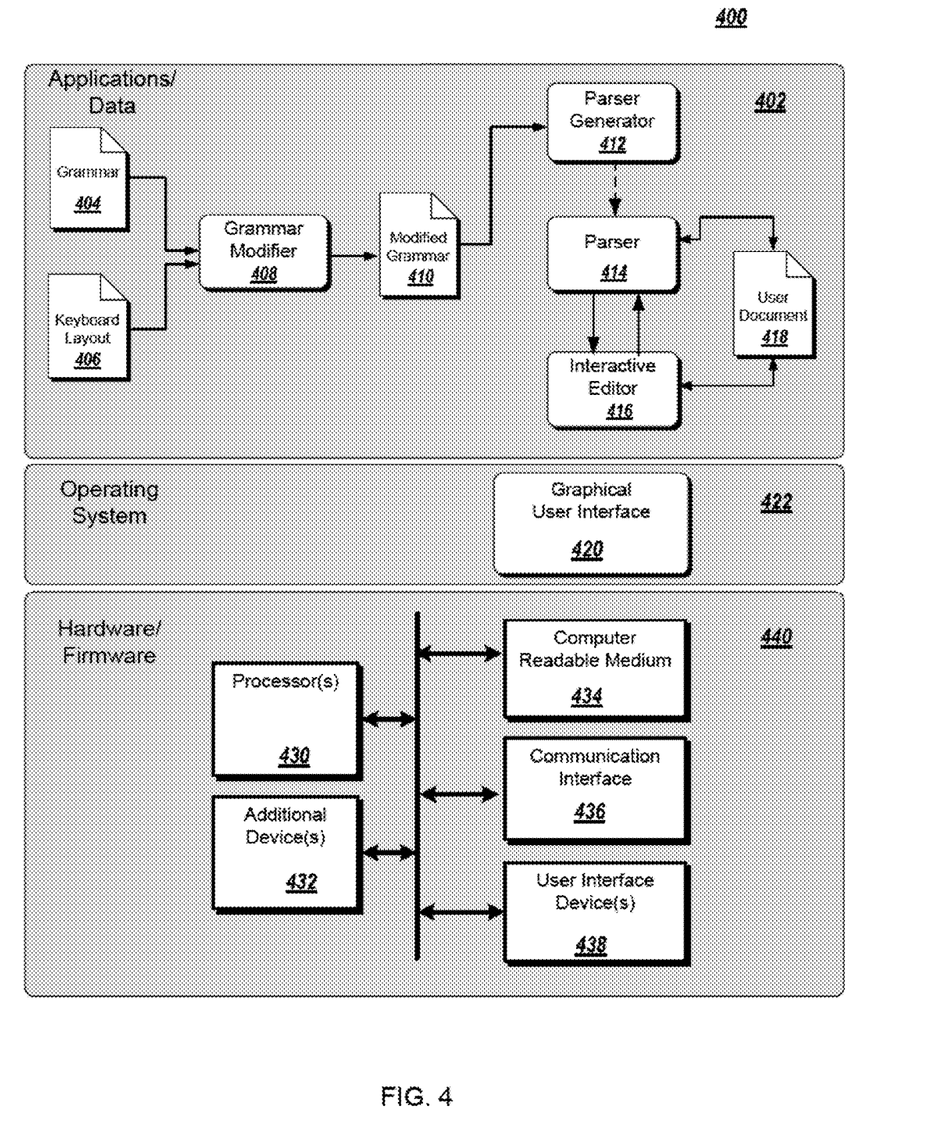
FIG. 4 illustrates an architecture of an example system for interactively replacing text in a document being edited.

In various implementations, processes 300 and 400 include additional operations for identifying a programming language common to the grammar and to programming language statements that user 110 enters. For example, the programming language identification operations can process the grammar structure and grammar rule composition to identify the grammar's programming language. In some implementations, the grammar includes statements that identify the programming language. In other implementations, a user (e.g., user 110 or another user initiating processes 300 or 400) inputs the programming language of the grammar. In various implementations, the identification operations process the programming language statements to identify the programming language (e.g., statement 112).

In some implementations, processes 300 and 400 include operations that identify one or more kinds of hard-to-type and corresponding easy-to-type symbols. The identification can occur by user prompt. For example, user 110 may run a process modifying grammar 102 and during the process input sets of hard-to-type symbols (e.g., left and right parentheticals) and the corresponding easy-to-type symbols (e.g., left and right brackets) that user 110 prefers to type in the text editor. In various implementations, the process inputs a file or listing of symbols sets. For instance, the files can include replacement suggestions for particular programming languages. In still other implementations, the result of the keyboard and programming language identification process is used in the selection of an appropriate set of symbols. The selection can also occur by an algorithm, as discussed in connection with system 100. A user can modify a selected set or access a user interface to modify suggested replacement sets to his or her personal preferences.

FIG. 4 illustrates an architecture of an example system 400 for interactively replacing text in a document being edited. Grammar 404 and keyboard layout 406 are provided to grammar modifier component 408. As described above, the keyboard layout can be determined by grammar modifier 408. Depending upon the keyboard layout, grammar modifier 408 determines at least one set of hard-to-type and easy-to-type symbols. Grammar rules in grammar 404 are iteratively analyzed to identify instances of the determined hard-to-type symbols.

In some implementations, modified grammar 410 is created by copying grammar 404 and inserting grammar rules into the copied grammar. The inserted grammar rules are the same as existing grammar rules, except that hard-to-type symbols in the existing grammar rules are replaced with easy-to-type symbols. In some instances, an action is inserted with each inserted grammar rule. The inserted action includes code that, when executed, causes replacement of an easy-to-type symbol in a user document 418 with a hard-to-type symbol. In various implementations, an error token including an action is inserted proximate to grammar rules that include hard-to-type symbols. The inserted error token includes code that causes replacement of an easy-to-type symbol in user document 418 with a hard-to-type symbol.

In some implementations, when grammar modifier 408 identifies a hard-to-type symbol in a grammar rule, a new grammar rule is not inserted unless a symmetric hard-to-type symbol is identified. For example, if a "(" hard-to-type symbol is identified, a new grammar rule including a bracket substituted for the parenthetical will not be created unless a sister ")" is identified in the grammar rule. In such case, both parentheticals are replaced with brackets.

Modified grammar 410 is processed by parser generator component 412 to generate parser component 414. In some implementations, parser generator 412 is the YACC program. Parser 414 can include an executable process and a finite state machine. The parser analyzes a sequence of tokens that are supplied as tokens by a lexical analyzer (e.g., the Lex program) and originate from an input stream including information from user document 418. In some implementations, parser 414 does not rely upon tokens supplied by a lexical analyzer but itself converts the input stream to tokens or processes the input stream.

User document 418 includes programming language statements. The document can be a block of information stored in a computing system. The block of information can be stored in permanent or temporary memory and can include a buffer or an array of information. Document 418 is accessed and modified by interactive editor component 416. For example, user 110 may interact with editor 416 to add, delete, or modify programming statements in user document 418.

Interactive editor 416 requests that parser 414 check the validity of programming language statements in user document 418. For example, programming language statements may include incorrect symbols or structure. In some implementations, parser 414 compiles the programming language statements of document 418 to produce an executable program. In other implementations, parser 414 checks the syntax validity of the programming language statements and replaces one or more easy-to-type symbols in document 418 with hard-to-type symbols. As described in processes 200 and 300, parser 414 can effect replacement through numerous methods (e.g., direct replacement or requesting that the text editor 416 replace).

Applications and data 402 are included on one or more operating systems 422 and one or more sets of hardware and firmware 440. For example, the grammar modifier 408, parser generator 412, parser 414, and interactive editor 416 components can be executed by hardware 440 and operating system 422. In some implementations, grammar modifier 408 and interactive editor 416 interact with users through different graphical user interfaces (GUIs) 420. For instance, one user may interact with a first GUI for creating a modified grammar and a second user may interact with a second GUI of an interactive editor 416.

In various implementations, the GUI for grammar modifier 408 is the same as, or is called by, the GUI for interactive editor 416. Additionally, the components interact with various hardware/firmware components 440. For example, interactive editor 416 interacts with user interface devices 438 to permit a user to modify user document 418. For example, a display device 438 presents a representation of user document 418 to the user and keyboard 438 enables the user to input modifications to user document 418. Communication interface 436 permits components 408, 412, 414 and 416 to interact with other computerized systems, for example, if some of the components are located in remote computing systems. For example, grammar modifier 408 may operate on a server device and interactive editor 416 may operate on a client device. Data 404, 406, 410, and 418 can be located in computer readable medium 434 associated with one or more hardware/firmware systems 440. One or more processors 430 can execute the operations of components 408, 412, 414, and 416 that can also be stored in computer readable medium 434.

In some implementations, system 400 executes processes 200 or 300. In other implementations, system 400 executes operations described in connection with system 100.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. The computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
selecting a first grammar rule in a computer programming language grammar that is used for determining a syntax validity of a computer programming code statement in a text editor, wherein the first grammar rule includes a first symbol that is syntactically correct for the computer programming code statement;
creating a second grammar rule and linking the second grammar rule within the grammar chain adjacent to the first grammar rule for the computer programming language grammar, the second grammar rule substantially identical to the first grammar rule but replaces the first symbol with an a second symbol, wherein the second symbol is syntactically incorrect for the computer programming code statement and the first and second symbols are associated with keys on a keyboard; and
associating an action with the computer programming language grammar, the action comprising executable code that, when executed, causes the second, syntactically incorrect symbol in the computer programming code statement in the text editor to be replaced with the first syntactically correct symbol; and
after or during editing of programming language statements within a document in the text editor, invoking a parser to check the syntax of the programming language statements based on the modified computer programming language grammar, wherein the parser, upon encountering a condition that satisfies the second grammar rule, invokes the action to replace the second symbol with the first symbol.

2. The method of claim 1, the invoked parser being generated from the computer programming language grammar with the associated action, wherein the parser interacts with the text editor to determine the syntax validity of computer programming code segments entered into the text editor by a user of the text editor.

3. The method of claim 2, further comprising:
identifying, by the parser, an instance of the second, syntactically incorrect symbol that satisfies the second grammar rule, entered into the text editor, and
replacing the identified instance of the second, syntactically incorrect symbol with an instance of the first, syntactically correct symbol such that the replaced symbol causes the computer programming code statement in the text editor to satisfy the first grammar rule.

4. The method of claim 1, wherein the first symbol and the second symbol share a same key of a keyboard.

5. The method of claim 4, where
the second symbol is an easy-to-type symbol that may be represented in the text editor by pressing only the key of the keyboard; and
the first symbol is a hard-to-type symbol that may be represented in the text editor by pressing the key of the keyboard in conjunction with at least one other key of the keyboard.

6. The method of claim 1, further comprising identifying a keyboard layout of a keyboard connected to a computing device for interfacing with the text editor, wherein the identified keyboard layout is utilized in an identification of the first and second.

7. The method of claim 1, further comprising determining a type of computer programming language of the computer programming language grammar and the computer programming code statement, wherein the type of computer programming language is utilized to identify the first and second symbols.

8. A system comprising:
one or more computers; and
a computer-readable medium coupled to the one or more computers having instructions stored thereon which, when executed by the one or more computers, cause the one or more computers to perform operations comprising:
selecting a first grammar rule in a computer programming language grammar that is used for determining a syntax validity of a computer programming code statement in a text editor, wherein the first grammar rule includes a first symbol that is syntactically correct for the computer programming code statement;
creating a second grammar rule and linking the second grammar rule within the grammar chain adjacent to the first grammar rule for the computer programming language grammar, the second grammar rule substantially identical to the first grammar rule but replaces the first symbol with a second symbol, wherein the second symbol is syntactically incorrect for the computer programming code statement and the first and second symbols are associated with keys on a keyboard; and
associating an action with the computer programming language grammar, the action comprising executable code that, when executed, causes the second, syntactically incorrect symbol in the computer programming code statement in the text editor to be replaced with the first, syntactically correct symbol; and
after or during editing of programming language statements within a document in the text editor, invoking a parser to check the syntax of the programming language statements based on the modified computer programming language grammar, wherein the parser, upon encountering a condition that satisfies the second grammar rule, invokes the action to replace the second symbol with the first symbol.

9. The system of claim 8, wherein the invoked parser is generated from the computer programming language grammar with the associated action, wherein the parser interacts with the text editor to determine the syntax validity of computer programming code segments entered into the text editor by a user of the text editor.

10. The system of claim 9, wherein the operations further comprise identifying by the parser, an instance of the second, syntactically incorrect symbol that satisfies the second grammar rule, entered into the text editor, and
replacing the identified instance of the second syntactically incorrect symbol with an instance of the first syntactically correct symbol such that the replaced symbol causes the computer programming code statement in the text editor to satisfy the first grammar rule.

11. The system of claim 8, wherein the first symbol and the second symbol share a same key of a keyboard.

12. The system of claim 11, where
the second symbol is an easy-to-type symbol that may be represented in the text editor by pressing only the key of the keyboard; and
the first symbol is a hard-to-type symbol that may be represented in the text editor by pressing the key of the keyboard in conjunction with at least one other key of the keyboard.

13. The system of claim 8, wherein the operations further comprise identifying a keyboard layout of a keyboard connected to a computing device for interfacing with the text editor, wherein the identified keyboard layout is utilized in an identification of the first and second symbols.

14. The system of claim 8, wherein the operations further comprise determining a type of computer programming language of the computer programming language grammar and the computer programming code statement, wherein the type of computer programming language is utilized to identify the first and second symbols.

15. A non-transitory computer storage medium encoded with a computer program, the program comprising instructions that when executed by data processing apparatus cause the data processing apparatus to perform operations comprising:
selecting a first grammar rule in a computer programming language grammar that is used for determining a syntax validity of a computer programming code statement in a text editor, wherein the first grammar rule includes a first symbol that is syntactically correct for the computer programming code statement;
creating a second grammar rule and linking the second grammar rule within the grammar chain adjacent to the first grammar rule for the computer programming language grammar, the second grammar rule substantially identical to the first grammar rule but replaces the first symbol with a second symbol, wherein the second symbol is syntactically incorrect for the computer programming code statement and the first and second symbols are associated with keys on a keyboard; and associating an action with the computer programming language grammar, the action comprising executable code that, when executed, causes the second, syntactically incorrect symbol in the computer programming code statement in the text editor to be replaced with the first, syntactically correct symbol; and after or during editing of programming language statements within a document in the text editor, invoking a parser to check the syntax of the programming language statements based on the modified computer programming language grammar, wherein the parser, upon encountering a condition that satisfies the second grammar rule, invokes the action to replace the second symbol with the first symbol.

16. The a non-transitory medium of claim 15, wherein the invoked parser is generated from the computer programming language grammar with the associated action, wherein the parser interacts with the text editor to determine the syntax validity of computer programming code segments entered into the text editor by a user of the text editor.

17. The non-transitory medium of claim 16, wherein the operations further comprise identifying by the parser an instance of the second, syntactically incorrect symbol that satisfies the second grammar rule, entered into the text editor, and replacing the identified instance of the second syntactically incorrect symbol with an instance of the first syntactically correct symbol such that the replaced symbol causes the computer programming code statement in the text editor to satisfy the first grammar rule.

18. The non-transitory medium of claim 15, wherein the first symbol and the second symbol share a same key of a keyboard.

19. The non-transitory medium of claim 18, where the second symbol is an easy-to-type symbol that may be represented in the text editor by pressing only the key of the keyboard; and the first symbol is a hard-to-type symbol that may be represented in the text editor by pressing the key of the keyboard in conjunction with at least one other key of the keyboard.

20. The non-transitory medium of claim 15, wherein the operations further comprise identifying a keyboard layout of a keyboard connected to a computing device for interfacing with the text editor, wherein the identified keyboard layout is utilized in an identification of the first and second symbols.

21. The non-transitory medium of claim 15, wherein the operations further comprise determining a type of computer programming language of the computer programming language grammar and the computer programming code statement, wherein the type of computer programming language is utilized to identify the first and second symbols.

* * * * *